July 29, 1969   R. H. WILLIAMS   3,458,375
NONCURL LAMINATION
Filed April 14, 1965
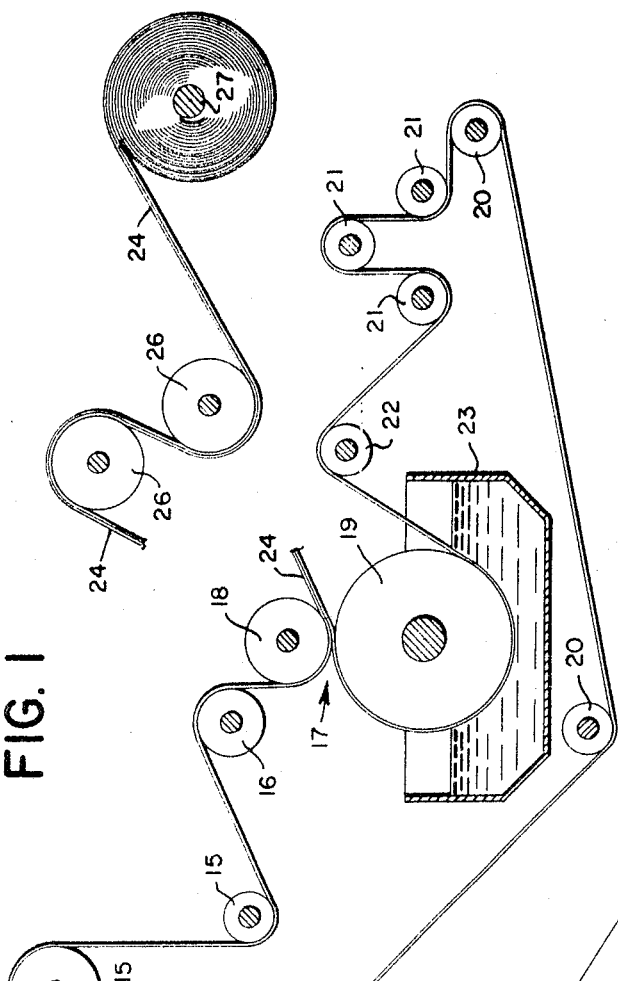
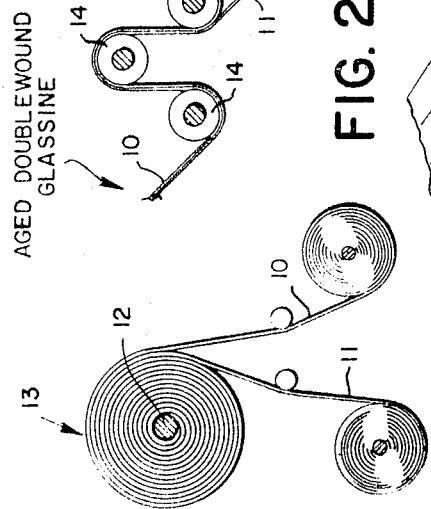
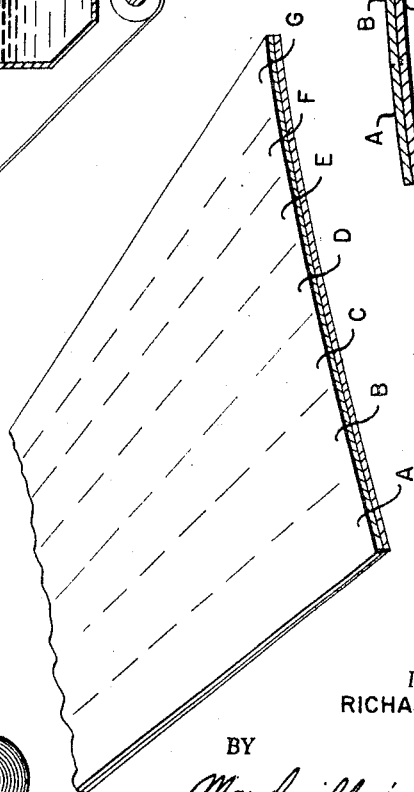
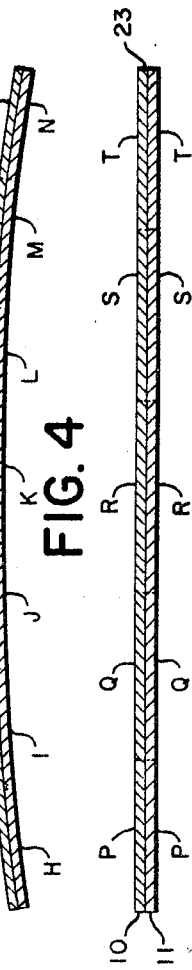
INVENTOR.
RICHARD H. WILLIAMS
BY
Mandeville & Schweitzer
ATTORNEYS

United States Patent Office 3,458,375
Patented July 29, 1969

3,458,375
NONCURL LAMINATION
Richard H. Williams, Kintnersville, Pa., assignor to Riegel Paper Corporation, New York, N.Y., a corporation of Delaware
Filed Apr. 14, 1965, Ser. No. 448,073
Int. Cl. B32b 29/06
U.S. Cl. 156—152      1 Claim

ABSTRACT OF THE DISCLOSURE

The disclosure is directed to a method of producing laminates from a plurality of glassine webs. The method include the steps of balancing the moisture contents in the contacting regions of the final laminate by first aging the webs on a single, multiple wound roll in predetermined face-to-face contact and registry and thereafter permanently uniting the webs in substantially the same registry. The resultant laminates are curl-free and have substantially uniform moisture contents, as measured through the laminate, at all points thereof, although the moisture distribution across the laminate may be irregular.

---

The present invention relates to methods of producing glassine laminates and, more particularly, to a method of producing a laminated glassine having substantially no tendency to curl. Glassine is defined in the Dictionary of Paper (2nd edition, 1951, American Paper and Pulp Association, New York, N.Y.) as follows: "A supercalendered, smooth, dense, transparent or semitransparent paper manufactured primarily from chemical wood pulps, which have been beaten to secure a high degree of hydration of the stock. This paper is grease resistant, and has a high resistance to the passage of air and many essential oil vapors used as food flavoring and, when waxed, lacquered, or laminated, is practically impervious to the transmission of moisture vapor. It is made in white and various colors; opaque glassines are produced by the addition of fillers. The basis weights may range from 12 to 90 pounds, the ordinary range being from 15 to 40 pounds (24 x 36—500). Glassine paper is used as a protective wrapper for all kinds of foodstuffs, tobacco products, chemicals, and metal parts, as well as for many purposes where its transparent feature is useful. For these purposes it is often converted into bags, envelopes, printed wraps, fluted cups, etc.; it is also used for lining boxes, cartons and as windows in window envelopes. It is also called glazed greaseproof paper. The German name is Pergamyn.

Glassine has long been recognized as a superior packaging material and has been widely employed in industry. The inherent beneficial properties of glassine (i.e., smoothness, gloss, wet strength, grease-resistance) have led to its extensive use in a large variety of laminates, one of which is a glassine-glassine laminate. A laminated glassine, while providing adequate strength and increased impermeability may, however, be subject to a tendency to curl across its width, the dimension normal to its machine direction of manufacture. It is the object of the present invention to provide a method of manufacturing a laminated glassine such that the laminate will have substantially no tendency to distort, or in other words, which will be substantially curl-proof, across its width.

As a result of certain empirical studies, it has been determined that webs of glassine tend to have a non-uniform moisture level across the width from edge to edge. More specifically, there are rather amorphous or irregularly defined regions or bands of moisture in any web of glassine which tend to extend longitudinally and which vary in moisture content in a more or less random manner from edge to edge. The reasons for the non-uniform distribution of moisture across glassine webs are not entirely understood; nevertheless, this non-uniformity of moisture distribution has been clearly established.

In accordance with the principles of the invention, cross-machine curling distortion is substantially eliminated in a glassine-glassine laminate by controllably pre-conditioning the various regions of each of the webs to be bonded to eliminate imbalances in moisture levels therebetween. Thus, the webs of the laminate are treated so as to have similar or conforming distributions of moisture levels. In other words, although the moisture levels across the widths of the webs are non-uniform, the moisture level through any specific transverse section of the laminate will be substantially uniform or balanced. This desirable uniformity of moisture levels through (as opposed to across) the bonded webs is expeditiously and comparatively simply achieved by initially, simultaneously winding the separate webs into a common roll in face-to-face contact. The double wound webs are then set aside for a predetermined pre-conditioning period during which the double wound webs tend to come to a moisture equilibrium in the areas of mutual face-to-face contact. That is to say, they have corresponding regions of similar moisture levels across their widths.

In accordance with the invention, the pre-conditioned webs are subsequently unwound from the common roll and are directed into a conventional laminating nip in a manner whereby regions having similar moisture levels will be bonded together in substantial registry. As will be understood, this has the effect of balancing or matching the moisture levels through the webs at each of the different moisture containing regions across the web thereby eliminating the tendency of curling normally caused by unbalanced moisture levels.

For a more complete understanding of the present invention and its attendant advantages, reference should be made to the following detailed description taken in conjunction with the accompanying drawing in which:

FIG. 1 is a schematic representation of the improved process of the invention;

FIG. 2 is a perspective view of a conventionally laminated glassine having a widthwise curl;

FIG. 3 is a diagrammatic cross-sectional view of the curled laminated glassine of FIG. 2 showing regions of unbalanced moisture levels therethrough; and FIG. 4 is a diagrammatic cross-sectional view of a curl-free laminate embodying the principles of the invention and having regions of balanced moisture levels therethrough.

As mentioned hereinabove, glassine webs tend to possess varying moisture levels in rather irregularly defined zones across their widths. For example, a pair of untreated webs would tend to have moisture non-uniformly distributed across their widths in irregularly defined, longitudinally extending regions or zones which, for the purpose of description, have been arbitrarily delineated and the moisture levels therein designated as A-G and H-N in FIG. 3. If these webs were to be conventionally laminated, the imbalance between the moisture levels in the bonded zones would tend to set up conditions most conductive for the internal stressing of the laminate in a manner which would curl or distort it, as clearly, schematically illustrated in FIG. 3.

In accordance with a most important aspect of the present invention, the webs to be laminated are brought together and pre-conditioned to eliminate the described, deleterious imbalance in moisture content across the web. More specifically, and with reference to FIG. 1, the method of the invention may be carried out by initially combining two separate glassine webs 10, 11 upon a common spindle 12 in face-to-face contact by a simultaneous winding operation. The resultant double wound roll 13 is then aged for a period of sufficient duration to allow the contacting regions of the interwound webs 10, 11 to reach a state of substantial moisture equilibrium. Typically, this will require a pre-conditioning period of at least 24 hours.

While the webs 10, 11 remain interwound, the moisture levels in the irregularly defined zones across the width of the web 10 will be conformed and will be properly balanced mutually with the moisture levels in the irregularly defined zones across the width of the web 11, before the two webs are bonded. In other words, in the proper aging of the double wound roll of glassine 13, according to the invention, regions of ultimate bonding or lamination are brought to substantially the same moisture content. Thus, as schematically shown in FIG. 4, opposing regions of the contacting webs, after pre-conditioning, have similar moisture levels in similar zones. As will be understood, the distribution of moisture from zone to zone across the width of the double wound webs may still be uneven. However, the specific moisture level through the webs is uniform and balanced in any given region, as indicated by the use of identical reference designations P-T in FIG. 4.

After pre-conditioning as above described, each of the pre-conditioned webs 10, 11 is drawn from the common roll 13 and threaded through a conventional laminating machine. As shown in FIG. 1, the web 10 is directed about idler rolls 14, tensioning rolls 15, preheating rolls 16, and then into the laminating nip 17 formed by the opposed laminating rolls 18, 19. The web 11 is similarly directed about idler rolls 14 where it is separated from the web 10 and directed over idler rolls 20, tensioning rolls 21, preheating rolls 22, and then through a substantially moisture impermeable bonding agent 23, typically a wax or a wax-resin composition, immediately before entering the laminating nip 17. The paths traveled by each of the webs are arranged such that the webs 10, 11 are reunited and bonded in the nip 17 with regions of similar moisture content in substantial registry. Ideally, the paths should be of equal length. However, it is not absolutely necessary for this condition to be rigidly met, (i.e., for the webs 10, 11 to be exactly in phase) since the irregularly defined regions of given moisture content tend to extend longitudinally of the webs for a considerable distance.

At the nip 17, the separate webs are bonded into a single laminated glassine web 24 having a substantially uniform moisture content therethrough at all of its transverse sections. Thereafter, the web 24 is conventionally advanced about chill rolls 26 before the process is completed by winding the finished laminate on a take-up roll 27.

It should be appreciated that in accordance with the principles of the invention, the finished laminated glassine 24 will be substantially "curl-proof." Tendencies to distort in the critical cross-machine direction as a result of unbalanced moisture through the bonded plies of the laminate are eliminated by winding the multiple plies into a common roll and aging them in face-to-face contact for a predetermined period, usually at least twenty-four hours. As will be appreciated, the new method is extremely simple, inexpensive, highly efficient, and may be carried out on conventional laminating machines without costly modification.

It is to be understood that the specific method herein illustrated and described is intended to be representative only, as certain changes may be made therein without departing from the clear teachings of the disclosure. Accordingly, reference should be made to the following appended claim in determining the full scope of the invention.

I claim:

1. A method of making a curl resistant glassine-glassine laminate, comprising
    (a) supplying first and second independent webs of glassine;
    (b) each of said webs having irregularly defined, longitudinally extending bands of moisture content across the widths of said webs, the moisture contents of adjacent bands being unequal;
    (c) directing said webs into contacting face-to-face relationship;
    (d) winding said contacting webs into a single double wound roll;
    (e) aging said double wound roll for a predetermined duration, not less than 24 hours, sufficient to accommodate moisture flow between said webs;
    (f) whereby moisture flow between contacting regions of said webs establishes an equilibrium of moisture content between said longitudinal bands of said contacting first and second webs;
    (g) unwinding the first and second webs from said double wound roll and directing them to a laminating station;
    (h) applying a coating of laminant to a surface of the first web;
    (i) uniting the coated surface of said first web with the second web in a predetermined face-to-face relationship;
    (j) said predetermined face-to-face relationship being such that said bands of said aged webs having balanced moisture content are in substantial registry; and
    (k) chilling said united webs to establish said curl resistant laminate.

References Cited

UNITED STATES PATENTS

| | | | |
|---|---|---|---|
| 1,962,882 | 6/1934 | Shotwell | 162—205 |
| 2,635,509 | 4/1953 | Cowie et al. | 162—205 |
| 2,975,094 | 3/1961 | Anderson | 156—152 X |
| 3,194,706 | 7/1965 | Utschig et al. | 156—152 X |

OTHER REFERENCES

Grant, Julius, A Laboratory Handbook of Pulp and Paper Manufacture, Longmans Green & Co., London, 1942 (pp. 186–187 relied upon).

EARL M. BERGERT, Primary Examiner

R. A. KILLWORTH, Assistant Examiner

U.S. Cl. X.R.

156—324; 161—235, 411; 162—204